INVENTOR
Burton H. Locke

United States Patent Office 2,894,091
Patented July 7, 1959

2,894,091
AWAKENING ALARM MECHANISM FOR VEHICLES

Burton H. Locke, Framingham, Mass.

Application November 13, 1957, Serial No. 696,082

4 Claims. (Cl. 200—61.57)

This invention relates to an alarm mechanism for motor vehicles for the purpose of awakening a driver should he or she relax, become drowsy, or fall asleep while operating the vehicle and thereby help to avoid an accident that generally occurs under such conditions.

The object of the invention is to provide a device, or mechanism, that can be applied to a conventional steering wheel of a vehicle, or constructed as a part thereof by the vehicle manufacturer, that will cause the horn of the vehicle to be sounded immediately upon the operator releasing gripping pressure on the wheel and alarm mechanism thereon which he naturally would do should he doze or relax due to becoming tired.

Another object of the invention is to provide a means that can be manually actuated by the operator to divorce the alarm mechanism from the horn actuating means at times when it is not required and to reenstate the same when the operator feels tired and considers it essential to his safety.

Another object is to provide a simple, inexpensive alarm mechanism that will actuate the normal horn switch on a vehicle so as to minimize changes from conventional constructions and to minimize the addition of new parts.

My improved alarm mechanism for vehicles comprises in one form a simple structure, or device, 10 that can be attached to a conventional steering wheel 11 which is equipped with a conventional ring form of switch 12 that actuates the horn on the vehicle when forced up or down by suitable pressure being applied to any part thereof.

Figure 2:
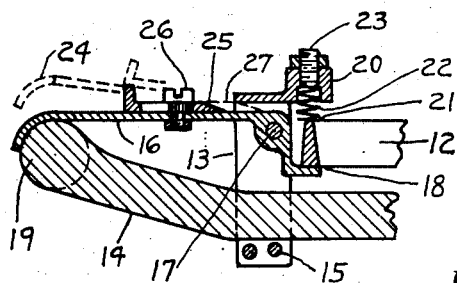
Figure 2 is an enlarged sectional elevation taken on line 2—2, of Figure 1.
Figure 1:
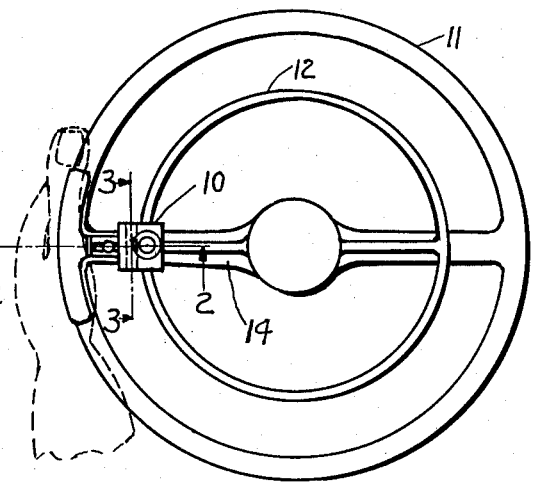
Figure 1 is a plan view of a conventional steering wheel of a vehicle with my device attached thereto.
Figure 3:
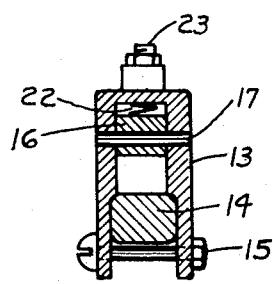
Figure 3 is an enlarged sectional elevation taken on line 3—3, of Figure 1.

The form of the invention shown in Figs. 1 to 3 inclusive comprises an inverted U-shaped yoke 13 that is set over a spoke 14 of the steering wheel 11 and is held in pressing engagement therewith by means of bolts 15. There is a lever 16 pivotally mounted within yoke 13 at 17. Lever 16 extends down in under the bottom 18 of the ring switch 12 and over the top of the rim 19 of the steering wheel 11.

There is a projection 20 on yoke 13 that extends over the top 21 of the ring switch 12 and a compression spring 22 that can be adjusted by a set screw 23 is positioned intermediate said projection and the top 21 of the ring switch to urge the ring switch downward to actuate the vehicle horn. Spring 22 is adjusted by screw 23 to a point to exert sufficient pressure onto the ring switch to actuate the same to sound the vehicle horn, and when said switch is actuated the lever assumes the position shown by dotted lines 24.

The vehicle operator generally holds the lever 16 down against the rim 19 of the steering wheel by pressure of his hand, as shown by broken lines in Figure 1, when operating whereat lever 16 is disposed to hold the ring switch in its neutral position and thereby eliminate the sounding of the horn which would normally be caused by spring 22. However, should the operator become drowsy or relax and fall asleep he normally would release the pressure of his hand and thereby allow the lever 16 to rise to position 24 which would allow spring 22 to actuate the ring switch causing the horn to sound which should awake the operator and normally avoid an accident. Furthermore, the effort required of the operator to concentrate and retain the horn from sounding would be instrumental in keeping him awake because any relaxation of his grip would permit the horn to sound. This he would endeavor to avoid.

I can conceive of my device being most convenient and useful on long continuous travel which becomes monotonous to an operator causing him to become drowsy. Also, in such travel the rotation of the steering wheel usually is confined to a fraction of a turn because normally there are no sharp curves to manipulate and therefore it would be no hardship for the operator to retain his grip onto the lever 16.

A slidable wedge block 25 is attached to lever 16 by one or more shoulder screws 26 and it can be slid into yoke 13, as shown by dotted lines 27, by the operator pressing his thumb thereagainst. This would hold lever 16 down against the rim of the steering wheel and thereby render the alarm device inactive. This would be done when the alarm was not required, such as in city driving; in heavy traffic; on sharp curvy roads and when parking, etc. At such times the lever 16 contacts the rim 19 of the steering wheel thereby forming an even surface for the operator's hands to grasp in steering the vehicle.

It will be noted that the pivot point 17 of the lever 16 is considerably closer to the ring switch than to the rim of the steering wheel which will minimize the effort required of the operator to hold the lever down as required when driving.

Figure 5:
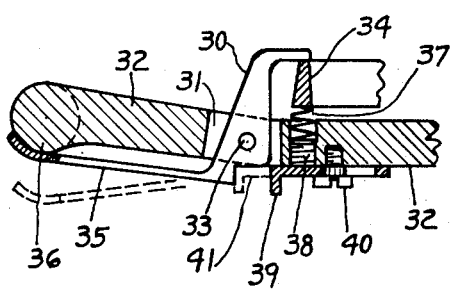
Figure 5 is an enlarged sectional elevation taken on line 5—5, of Figure 4.
Figure 4:
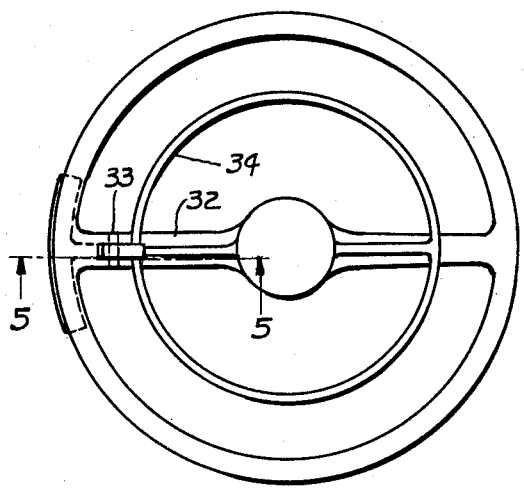
Figure 4 is a view similar to Figure 1 of a modified embodiment of the invention to show a method of how my mechanism might be incorporated in the steering wheel structure of a vehicle.

Figures 4 and 5 show in a simple manner how my alarm mechanism could be incorporated in the construction of a vehicle steering wheel by the vehicle manufacturer. In this structure, the lever 30 is contained in a slot 31 provided in a spoke 32 of a steering wheel and is pivoted at 33.

The lever 30 is disposed to press the ring switch 34 downward and the operating end 35 of the lever extends down through the slot 31 and in under the rim 36 of the steering wheel and can be pressed by the operator's fingers when steering the vehicle. A spring 37 having an adjusting screw 38 acts in the same manner and for the same purpose as the spring 22 shown in Figure 2. A slidable lug 39 is fastened to the spoke 32 by means of one or more shoulder screws 40. Lug 39 can be slid over lever 30 by the operator's fingers engaging the same to position shown by dotted lines 41 to render the alarm feature inactive when not required, as explained for the form shown in Figure 2.

The complete mechanism shown in Figures 4 and 5 operates in the same manner with the same results being afforded as set forth in the form shown in Figures 1 to 3 inclusive. Therefore, no further explanation is deemed necessary.

In either form the hand contacting portion of the mechanism could be in the form of a continuous ring circling the ring switch along the rim of the steering wheel if desired. Furthermore, in either form the equipment shown is of the simplest form to show the invention and it is obvious that more refined and elaborate equipment could be substituted for that shown to form a more stream line assembly, if desired.

Therefore, I do not wish to be confined to the exact details shown as the same are susceptible of modification within the spirit or scope of the invention set forth.

I claim:

1. An awakening alarm mechanism for motor vehicles comprising resilient means normally disposed to cause pressure actuation of a pressure operative horn switch on a vehicle, manual operative means substantially at the periphery of the steering wheel on the vehicle disposed to cancel the pressure actuation of said resilient means when operated, individual manual operative means disposed to cooperate with the last said means to positively prevent the operation of said resilient means when the same is not required.

2. An awakening alarm mechanism for vehicles comprising resilient means disposed to normally cause actuation of a pressure operative horn switch on a vehicle, means substantially at the periphery of the steering wheel on the vehicle disposed to be pressed by the operator of the vehicle to manually render the resilient means ineffective, individual manual operative means disposed to cooperate with the last said means to positively cancel the effect of said resilient means when the same is not required.

3. An alarm mechanism for motor vehicles comprising a lever pivotly attached to the steering wheel of a vehicle, one end portion of said lever contacting a pressure operative horn switch mounted on the steering wheel of the vehicle, the other end portion of said lever extending substantially to the periphery of the steering wheel in suitable position to be pressed by an operator of the vehicle when steering the vehicle, resilient pressure means to cause pressure actuation of the horn operating switch, said lever being such as to prevent the resilient means from being effective at times when the portion of the lever at the periphery of the wheel is pressed and held by the operator of the vehicle, optional manual operative means to anchor the lever in position to cancel the resilient means at times when the same is not required.

4. In combination, a steering wheel on a motor vehicle, a pressure operative horn switch on the steering wheel and an awakening alarm actuating mechanism associated therewith, the alarm actuating mechanism comprising in combination resilient means to normally actuate the horn operating switch and a manual operative control means on said wheel of a structure that when pressed will prevent said resilient means from actuating the horn operating switch, individual manual operative means disposed to cooperate with the last said means to positively cancel the effect of said resilient means when the same is not required.

References Cited in the file of this patent

UNITED STATES PATENTS

| 1,822,956 | Cox | Sept. 15, 1931 |
| 2,568,482 | Blomberg | Sept. 18, 1951 |
| 2,575,926 | Murray | Nov. 20, 1951 |

FOREIGN PATENTS

| 536,819 | Germany | Oct. 27, 1931 |